US 6,718,690 B2

(12) United States Patent
Podgurney et al.

(10) Patent No.: US 6,718,690 B2
(45) Date of Patent: Apr. 13, 2004

(54) INSECT EXTERMINATOR

(76) Inventors: Kenneth Podgurney, P.O. Box 360, Whitecourt, Alberta (CA), T7S 1N5; Roger Beaudoin, 99 Rivervalley Estates, Whitecourt, Alberta (CA), T7S 1J9

( * ) Notice: Subject to any disclaimer, the term of this patent is extended or adjusted under 35 U.S.C. 154(b) by 0 days.

(21) Appl. No.: 10/152,015

(22) Filed: May 22, 2002

(65) Prior Publication Data
US 2003/0110681 A1 Jun. 19, 2003

(30) Foreign Application Priority Data
Dec. 12, 2001 (CA) .............................................. 2364970

(51) Int. Cl.⁷ ................................................ A01M 5/04
(52) U.S. Cl. .......................................... 43/138; 43/140
(58) Field of Search ................. 43/138, 140; 56/10.2 E

(56) References Cited

U.S. PATENT DOCUMENTS

| 1,325,475 A | | 12/1919 | Kemp | |
|---|---|---|---|---|
| 1,486,307 A | | 3/1924 | Seefluth et al. | |
| 1,624,240 A | | 4/1927 | Harwood et al. | |
| 1,848,614 A | | 3/1932 | Folmer et al. | |
| 1,962,420 A | | 6/1934 | Bradley | 43/112 |
| 2,029,225 A | | 1/1936 | Ekre | 43/138 |
| 2,052,945 A | | 9/1936 | Scott | 43/112 |
| 2,098,647 A | | 11/1937 | Lindsley | 43/112 |
| 2,177,846 A | | 10/1939 | Swangren | 43/112 |
| 2,256,125 A | * | 9/1941 | Noffsinger et al. | 43/138 |
| 2,835,071 A | | 5/1958 | Partridge | 43/112 |
| 2,912,787 A | | 11/1959 | Partridge | 43/112 |
| 3,321,862 A | | 5/1967 | Peek | 43/112 |
| 3,473,251 A | | 10/1969 | Kahn | 43/112 |
| 3,491,478 A | | 1/1970 | Gilbert | 43/112 |
| 3,758,980 A | | 9/1973 | Bialobrzeski | 43/112 |
| 3,835,577 A | * | 9/1974 | Soulos | 43/112 |
| 3,846,932 A | | 11/1974 | Bialobrzeski | 43/138 |
| 3,894,351 A | * | 7/1975 | Iannini | 43/112 |
| 4,148,150 A | | 4/1979 | Harrell | 43/144 |
| 4,300,306 A | * | 11/1981 | Hudgin | 43/112 |
| 4,523,404 A | | 6/1985 | DeYoreo | 43/112 |
| 5,195,309 A | * | 3/1993 | Mossman | 56/119 |
| 5,214,876 A | | 6/1993 | Sukup | 43/140 |
| 5,255,469 A | | 10/1993 | Sukup et al. | 43/140 |
| 5,682,707 A | | 11/1997 | Chastain | 47/1.44 |
| 5,974,728 A | | 11/1999 | Nichols | 43/140 |

OTHER PUBLICATIONS

Exocutor™ Commercial U.V. Electrocutor, printout from website, http://www.flytrappers.com/exocutor.htm, printed Aug. 16, 2001, 2 pages.

Electric bug zapper kills without chemicals, printout from Farm Show Magazine website, copyright Farm Show 2000, printed Aug. 17, 2001, 1 page.

Insects can protect garden, David James, printout from website, http://www.greenerplants.com/page154.html, printed Aug. 28, 2001, 2 pages.

Wheels sport new labels, Anita Lienert, printout from The Detroit News website, http://detnews.com/autosweekly/0104/25/lead/lead.htm, printed Aug. 15, 2001, 1 page.

(List continued on next page.)

Primary Examiner—Charles T. Jordan
Assistant Examiner—Bret Hayes

(57) ABSTRACT

A device for killing insects, comprising a frame mounted for movement over the ground in a direction of travel, a first grid and a second grid mounted on the frame, the first grid and the second grid each extending laterally in relation to the direction of travel and being spaced apart in the direction of travel by a gap such that insects to be killed bridge the gap when the frame is moved over a field containing insects and a power supply connected to supply an insect killing voltage to one of the first grid and the second grid.

20 Claims, 6 Drawing Sheets

OTHER PUBLICATIONS

Replacement/Installation Instructions for DC Ignitors #51499, #51524, #51504, #51506, R.W. Beckett Corporation, dated prior to the filing date of the present application, 3 pages.

Transformer and Magnetic Components/Assemblies Designed and Manufactured to meet your requirements!, printout from Custom Coils, Inc. website, http://www.customcoils.com, website last modified on Apr. 2, 2002, 4 pages.

Burners, Controls and Ignitors, printout from Carlin® Combustion Technology, Inc. website, http://www.carlincombustion.com, dated at least as early as the filing date of the present application, 5 pages.

Burner Parts, printout from website, http://www.indequipment.com, website last updated on Jan. 1, 2001, 6 pages.

* cited by examiner

INSECT EXTERMINATOR

BACKGROUND OF THE INVENTION

This invention relates to a device for exterminating insects by electrocution.

Modern methods for controlling the populations of flying insects, such as grasshoppers, which are harmful to crops and reduce overall yields within an agricultural setting typically rely on the use of chemical insecticides. Recent observations suggest that prolonged exposure of agriculture land to chemical insecticides tends to sterilize the soil thus having a tendency to reduce overall yield. Recognizing this trend an improved device for controlling insect populations through electrocution is described.

Since the early 1900s various devices to exterminate insect pests through electrocution have been developed. Early developments as described by Walter Kemp in U.S. Pat. No. 1,325,475 and William Harwood in U.S. Pat. No. 1,624,240 included elaborate means for gathering the flying insects, directing them to an electrocution means, collecting and disposing of the dead insects. In these early devices batteries provided the source of high voltage electricity used to ensure instantaneous electrocution of the insects as they attempted to pass through an open circuit electrical grid. Although these devices proved to be effective their use was restricted by battery life. With the introduction of trucks and tractors, larger and more sophisticated devices were proposed. Oscar Ekre in U.S. Pat. No. 2,029,225 describes one such device. This device was mounted to the front of a truck and was comprised of a large electric grid with side extension to cover a wide swath as the device was driven through a field. Long finger extensions were provided to agitate the plants with the intent to flush up insects and lighting was employed to further attract the flying insects to the electric grid.

In the early 1970s, Walter Bialobrzeski described in U.S. Pat. Nos. 3,758,980 and 3,846,932 further improvements to a vehicle mounted insect exterminator with the introduction of a novel means of constructing an electrical grid and by introducing an opened bottom compartment for insect containment, respectively. High voltage and low current electric power for insect electrocution was delivered through the use of a battery or as generated by the tractor.

SUMMARY OF THE INVENTION

The present invention is directed at a new and improved mobile device for exterminating field insects by electrocution.

This invention according to a first aspect is comprised of two or more open circuit electrical grids mounted on frame for movement over the ground, in which the grids are spaced apart in the direction of travel and are connected to a high voltage power supply sufficient to kill insects that bridge the gap between the grids.

Thus, according to an aspect of the invention, there is provided a device for killing insects, comprising a frame mounted for movement over the ground in a direction of travel, a first grid and a second grid mounted on the frame, the first grid and the second grid each extending laterally in relation to the direction of travel and being spaced apart in the direction of travel by a gap such that insects to be killed bridge the gap when the frame is moved over a field containing insects and a power supply connected to supply an insect killing voltage differential between the first grid and the second grid.

According to further aspect of the invention, the power may be supplied by a DC ignitor.

In a further aspect of this invention, there is provided a barrier extending forward and rearward of the grids to prevent vegetation from contacting the grids and being set on In other aspects of the invention, three grids are provided, each being formed of a mesh, with the center grid grounded and having smaller mesh size than the outer grids. By this mechanism, insects killed fall between the grids for later collection.

In a further aspect of the invention, the device may be arranged in an array for drawing across a field in the manner of irrigation devices.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, the word "comprising" is used in its non-limiting sense to mean that items following the word in the sentence are included and that items not specifically mentioned are not included. The use of the indefinite article "a" in the claims before an element means that one of the elements is specified, but does not specifically exclude others of the elements being presented, unless the context clearly requires that there be one and only one of the elements.

Figure 1:
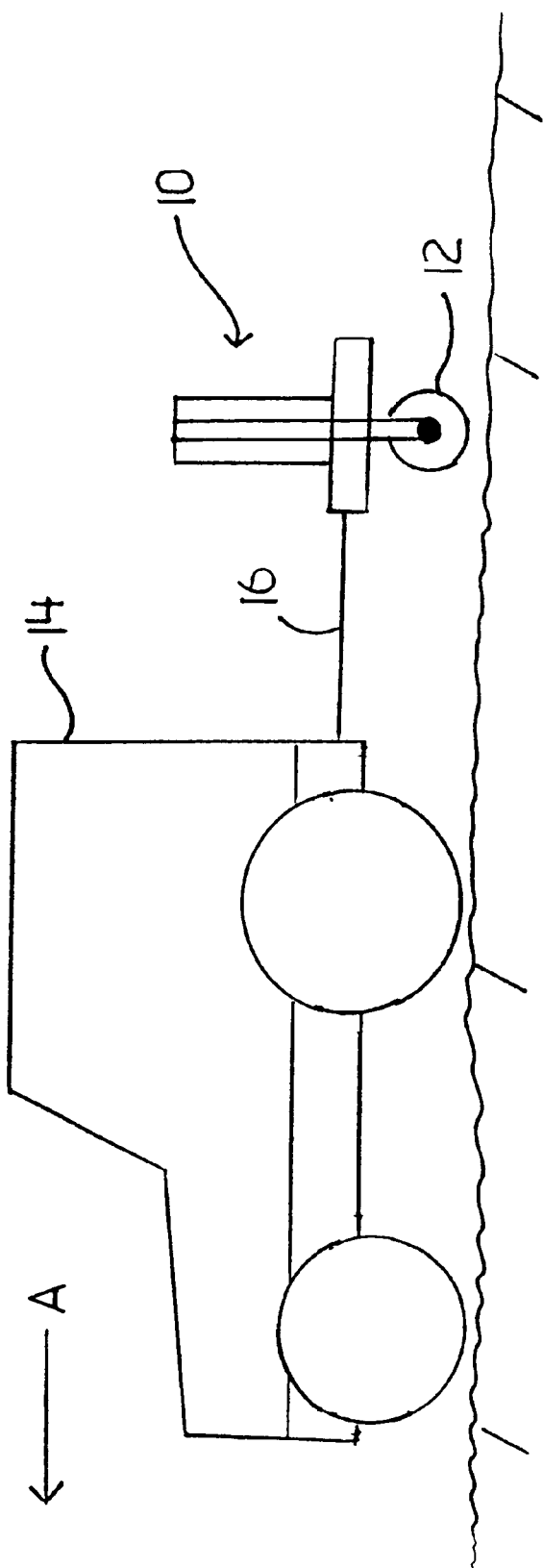
FIG. 1 is a side view of a device according to the invention pulled behind a vehicle over a ground surface.
Figure 2:
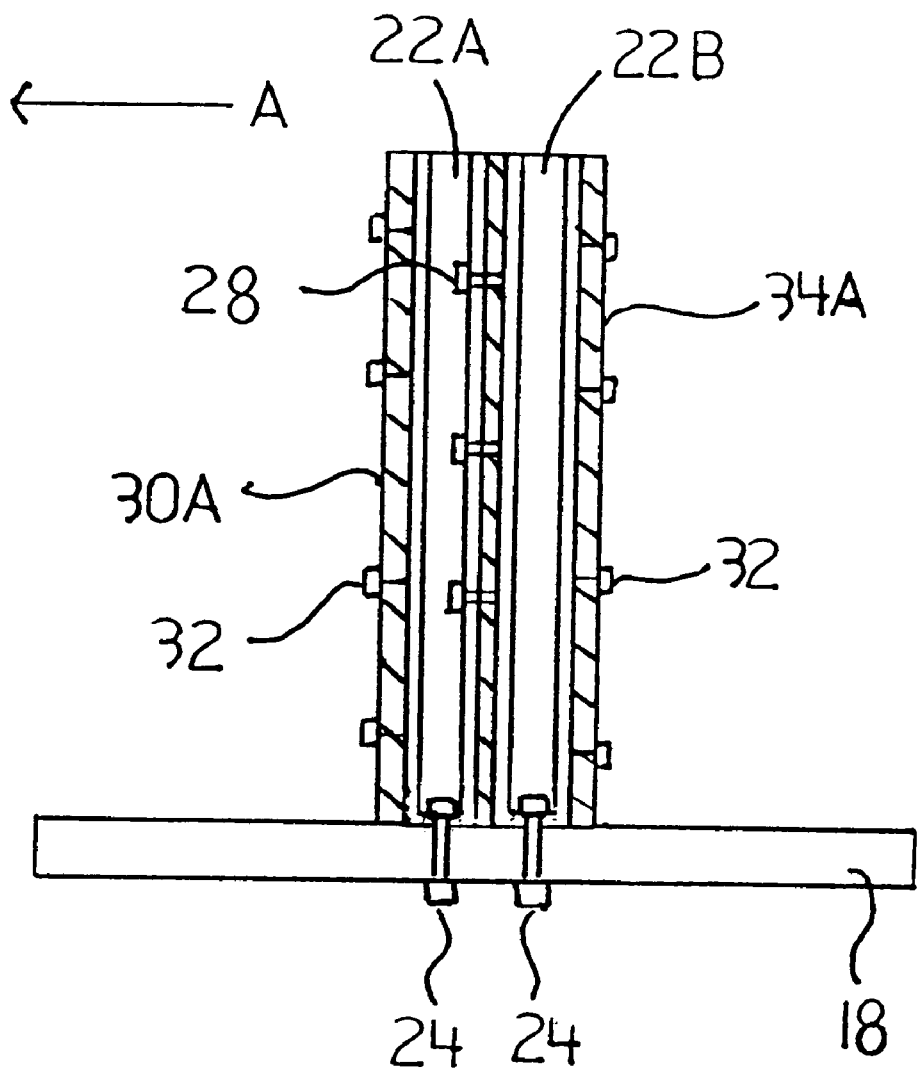
FIG. 2 is side view of a device according to the invention.
Figure 3:
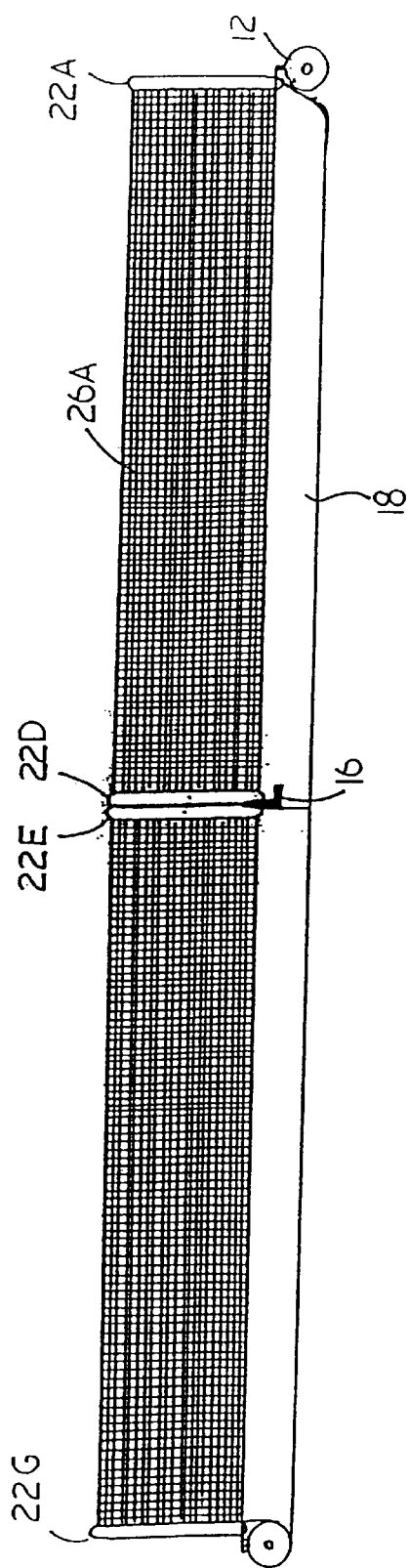
FIG. 3 is a front elevation view of the device of FIG. 2.
Figure 4:
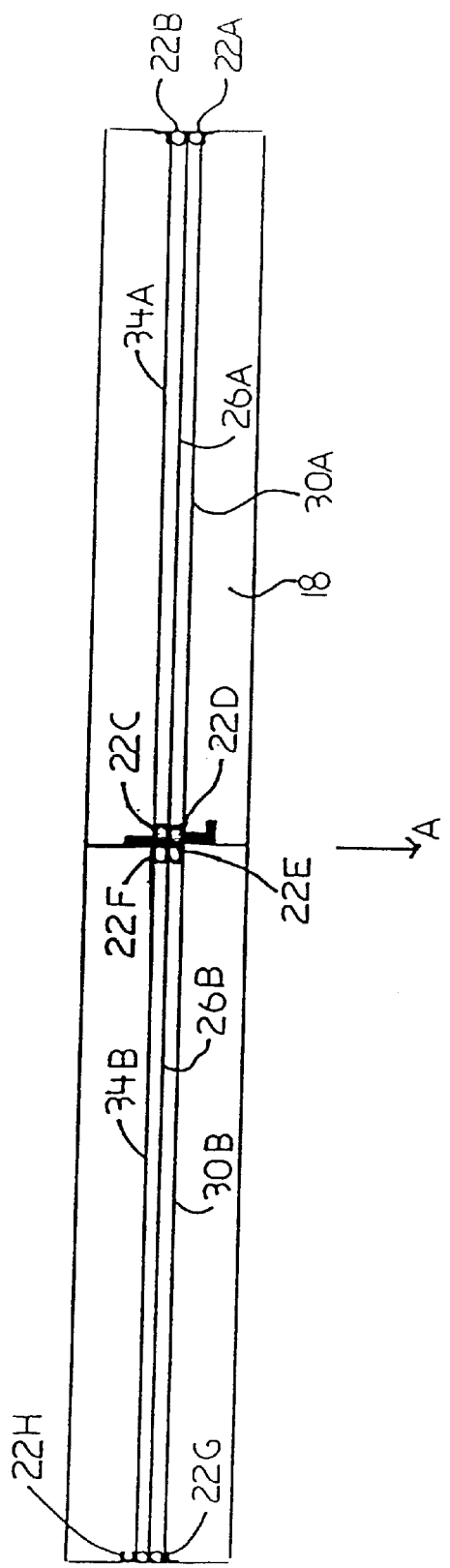
FIG. 4 is a top view of the device of FIG. 2.

Referring to FIG. 1, a device 10 for electrocuting insects is mounted on wheels 12 and drawn by a wheeled tractor 14 or such other suitable vehicle using a conventional towing assembly 16. The wheels 12 may be vertically adjustable in conventional fashion, so that the height of the device 10 may be varied. Referring to FIGS. 2–4, the device 10 includes a frame formed of a plate 18, and posts 22A–22H extending vertically from the plate 18 and secured to the plate 18 by any convention means, such as pins 24. For each laterally extending section of the device 10, there are four posts, two at each end of the laterally extending section.

The plate 18 extends laterally as far as desired, within the strength limitations of the plate 18. For making plural sections, multiple adjacent plates 18 may be used, with the posts being located at opposed ends of the plate. The posts 22C and 22F and posts 22D and 22E may be secured together using pins or other suitable means to enable multiple sections to be joined together to provide a desired width of swath.

A center grid 26A is secured between two posts 22A, 22B at one side of the device, and between two posts 22C and 22D at the center of the embodiment shown in FIGS. 2–4.

Pins 28 may be used to secure the posts 22A, 22B and 22C and 22D together to hold the center grid 26. The particular manner of holding the center grid 26 is not critical and any of various ways may be used to secure the grid 26 on the frame.

A forward grid 30A is secured to the outer side of posts 22A and 22D by suitable pins 32, and a rearward grid 34A is secured to the outer side of posts 22B and 22C by suitable pins 32. Likewise, center grid 26B, forward grid 30B and rearward grid 34B are secured to posts 22E, 22F, 22G and 22h in like manner.

The grids 26A, 26B, 30A, 30B, 34A and 34B each extend laterally in relation to a direction of travel illustrated by the arrow A in FIGS. 1, 2 and 4. As many lateral sections may be used as required in conventional fashion for agricultural implements. The grids 26A, 26B, 30A, 30B, 34A and 34B are each preferably formed of a mesh of uninsulated conducting wires. The grids 26A, 26B, 30A, 30B, 34A and 34B are spaced from each other by an amount that depends on the insects to be killed, but for grasshoppers may be spaced by a gap of about 1 inch. The spacing is such that insects to be killed bridge the gap between the grids. An insect bridges the gap when its presence in the gap causes an electrocuting current to pass from grid to grid through the insect. The center grids 26A, 26B should have a smaller mesh size, for example one-half inch, then the forward grids 30A, 30B and the rearward grids 34A, 34B, which may have a mesh size of about one inch. The plate 18 may be about three feet long in the direction of travel (extending about 17 inches each side of the grids) and should be sufficiently impervious to vegetation and extend sufficiently forward and rearward of the grids that vegetation does not contact the grids when the device 10 is drawn across a field. The posts 22A–22H may each be one inch square in cross-section and about three feet high, sufficiently high to catch insects that are disturbed as the plate moves across vegetation. The grids may also be made of parallel strands, but a mesh design, with intersecting or woven wires is preferred.

The posts 22A–22H, the pins 24, 32 and the plate 18 may all be made of a suitable plastic, moulded in conventional fashion, and should in any event be made of electrically non-conducting material.

Figure 5:
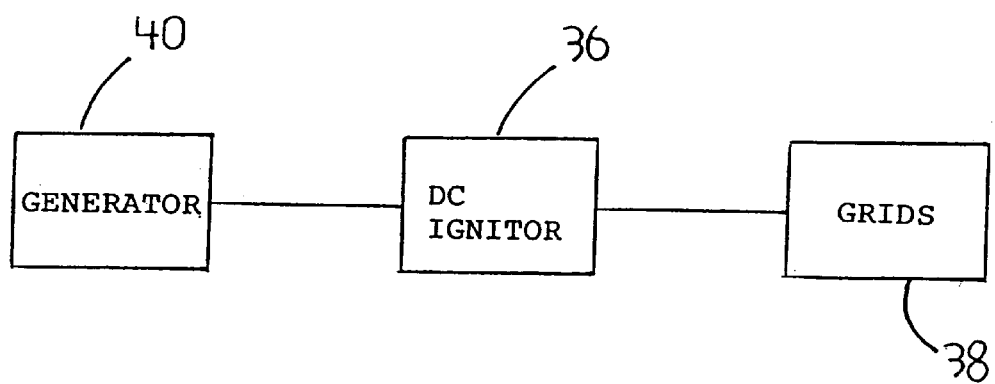
FIG. 5 is an electrical schematic showing a power supply for the device of FIG. 2.

A power supply for the grids is shown in FIG. 5. A conventional DC ignitor 36 supplies electrical energy to the grids 38, and is connected a conventional generator 40 such as a 1000 Watt generator. The DC ignitor may be a DC Ignitor 51499, 51524, 51504 or 51506 available from R. W. Beckett Corporation of Elyria, Ohio, USA, or any other suitable power supply to provide an insect killing voltage to the grids 38. Detailed circuit diagrams for the DC Ignitors explaining how they are to be connected to the generator 40 are available from their respective manufacturers. The DC ignitor 36 supplies a voltage differential between the center grids 26A, 26B and their respective outer grids 30A, 30B, 34A and 34B. This may be achieved by voltage of opposite polarity or the center grid or the outer grids may be grounded. It is preferred to ground the outer grids for safety reasons.

Figure 6A:
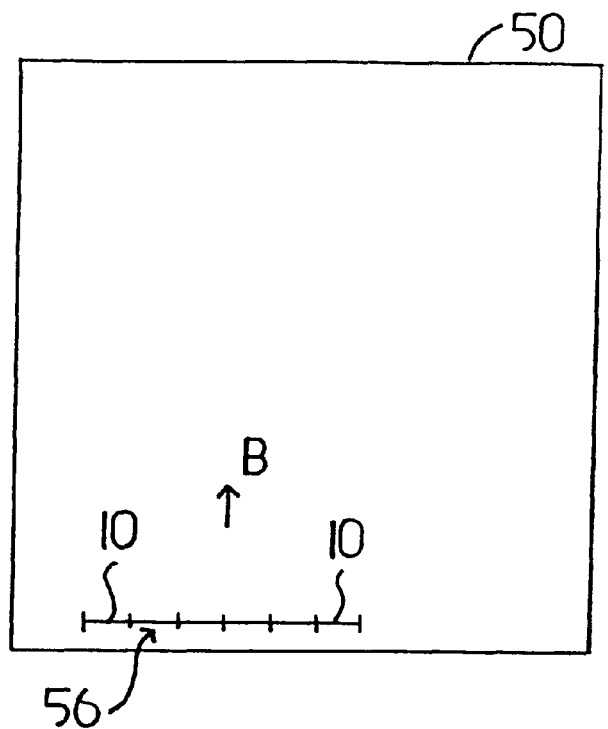
FIGS. 6A and 6B illustrate operation of an insect killing device in an array across a field.
Figure 6B:
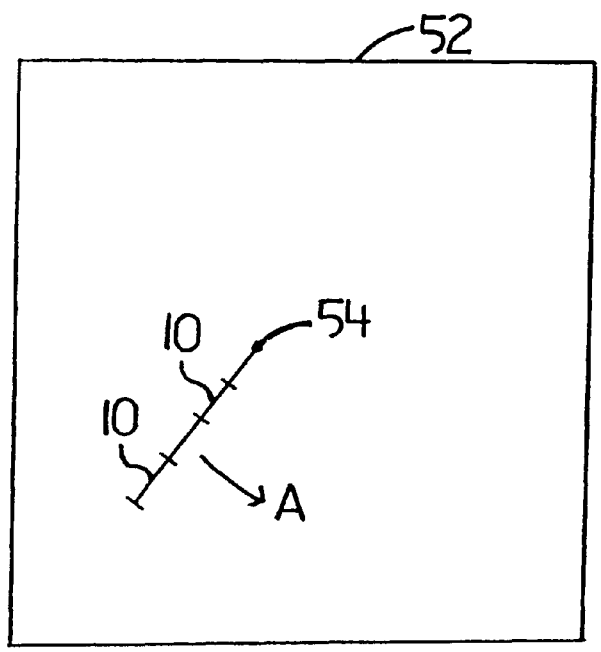

As shown in FIGS. 6A and 6B, multiple devices 10 may also be fitted together laterally and drawn across a field 50, 52 in a large swath, such as in the manner used in irrigation. The motion of the multiple devices 10 may be rotation about a pivot 54 as shown by arrow A, or each may move in the same direction as shown by arrow B at the same speed as each other in an array 56 across a field. The pivot, wheels for the devices 10 and driving mechanism may all be the same as used for irrigation.

The grids 22A–22H are made of uninsulated conductors and thus may be energized at any point around the respective grids, although it is most convenient to connect the power supply to the grids at the lateral edges of the grid assembly. Alternatively, if parallel wires are used for the grids, a single wire may be used to form the grid by passing it though equally spaced holes within the insulated grid members and terminating each end of the conducting wire to a grid element contact. In any case, the grid as constructed will form a single side of an electrical circuit.

The circuit of FIG. 5 supplies a voltage difference between the grids 22A–22H such that when an insect bridges between one of the grids the resulting discharge of electric current is sufficient to kill the insect. Any of various circuits may be used to provide this function.

The plate 18 may be a single plate of any suitable material and acts as a barrier to vegetation contacting the grids. The plate 20 conveniently extends from the base of the grids 22A–22H. By virtue of the arrangement of the grids, with different mesh sizes, the insects pass through the outer grid elements, are electrocuted, then collect between the grid elements.

Immaterial variations may be made to the embodiments described here without departing from the essence of the invention.

We claim:

1. A device for killing insects, comprising:

a frame mounted for movement over the ground in a direction of travel;

a first grid and a second grid mounted on the frame;

the first grid and the second grid each extending laterally in relation to the direction of travel and being spaced apart in the direction of travel by a gap such that insects to be killed bridge the gap when the frame is moved over a field containing insects; and a power supply connected to supply an insect killing voltage differential between the first grid and the second grid.

2. The device of claim 1 in which the first grid is spaced forward of the second grid in the direction of travel, and the second grid is grounded.

3. The device of claim 2 further comprising a third grid, the third grid extending laterally in relation to the direction of travel and being spaced apart from the second grid opposite to the direction of travel such that insects to be killed bridge between the third grid and the second grid when the frame is moved over the field containing insects.

4. The device of claim 1 in which each of the first grid and the second grid is a wire mesh.

5. The device of claim 1 further comprising a barrier extending forward of the first grid in the direction of travel for protecting against contact of the first grid and the second grid with vegetation.

6. The device of claim 5 in which the frame has a base, and the barrier is a plate forming the base of the frame.

7. The device of claim 1 in which the power supply is a generator connected to a DC ignitor.

8. The device of claim 1 in which conductors forming the first grid and second grid respectively are spaced by different amounts in the first grid as compared with the second grid.

9. The device of claim 3 in which the second grid has conductors spaced by smaller spacings than conductors spaced in the first grid and the third grid.

10. The device of claim 9 in which each of the first grid, the second grid and the third grid is a mesh.

11. A device for killing insects, comprising:

a frame mounted for movement over the ground in a direction of travel, the frame having a base;

a live grid, a forward grounded grid and a rearward grounded grid, each mounted on the frame;

the live grid, the forward grounded grid and the rearward grounded grid each extending laterally in relation to the direction of travel;

the live grid being between the rearward grounded grid and the forward grounded grid and being spaced apart in the direction of travel from each of the rearward grounded grid and the forward grounded grid by respective gaps such that insects to be killed bridge the gaps when the frame is moved over a field containing insects;

a barrier forming a base for the frame and the barrier extending forward of the forward grounded grid in the direction of travel for protecting against contact of the live grid and the forward grounded grid with vegetation; and a power supply connected to supply an insect killing voltage differential between the live grid and the forward and rearward grids.

12. The device of claim 11 in which each of the live grid, the forward grounded grid and the rearward grounded grid are formed of a mesh having a mesh size.

13. The device of claim 12 in which the mesh size of the live grid is smaller than the mesh size of the forward grounded grid and the rearward grounded grid.

14. A device for killing insects, comprising an open circuit electrical grid assembly having three parallel grid elements extending laterally and spaced from each other by insulating spacer posts;

the grid elements being arranged to have a center grid element and a pair of outer grid elements;

a means for supplying an insect killing voltage differential to the open circuit electrical grid assembly; and a lower plate extending laterally over the full width of the open circuit electrical grid assembly and the plate being positioned to allow a leading edge of the lower plate to contact and yield plants to agitate the plants to disturb insects and extending forwardly and rearwardly of the grid elements to protect the plants from contacting the grid assembly as the grid assembly passes over the plants.

15. The device of claim 14 in which the means for supplying the insect killing voltage differential comprises a DC ignitor.

16. The device of claim 14 in which the space between the grid elements is chosen for electrocution of grasshoppers.

17. A device for killing insects, comprising:

an open circuit electrical grid assembly mounted on a frame for travel over the ground in a direction of travel, the open circuit electrical grid assembly extending laterally in relation to the direction of travel;

a means for supplying an insect killing voltage differential to the open circuit electrical grid assembly; and a lower plate extending laterally over the full width of the open circuit electrical grid assembly and the plate being positioned to allow a leading edge of the lower plate to contact and yield plants to agitate the plants to disturb insects and extending forwardly and rearwardly of the grid assembly to protect the plants front contacting the grid assembly as the grid assembly passes over the plants.

18. The device of claim 17 in which the lower plate is made of electrically non-conducting material.

19. Multiple devices each in accordance with the device of claim 1, wherein the multiple devices are arranged in an array for drawing across the field.

20. Multiple devices each in accordance with the device of claim 11, wherein the multiple devices are arranged in an array for drawing across the field.

* * * * *